United States Patent [19]

Yamaguchi et al.

[11] 3,950,295

[45] Apr. 13, 1976

[54] METHOD OF PREPARING A COMPOSITION CONTAINING GYPSUM, A VINYL MONOMER AND SULFITE ION

[75] Inventors: Tadashi Yamaguchi; Takayuki Ono, both of Sendai; Hiroshi Hoshi, Narashino, all of Japan

[73] Assignee: Mitsui Toatsu Chemicals, Incorporated, Tokyo, Japan

[22] Filed: Feb. 1, 1974

[21] Appl. No.: 438,532

[30] Foreign Application Priority Data

Feb. 3, 1973   Japan.............................. 48-13920

[52] U.S. Cl. ......... 260/29.6 S; 106/90; 260/29.6 R; 260/42.53; 260/42.55
[51] Int. Cl.²............................................ C08J 3/20
[58] Field of Search........ 260/29.6 S, 42.53, 29.6 R, 260/42.55; 106/90

[56] References Cited
UNITED STATES PATENTS

| | | | |
|---|---|---|---|
| 2,990,382 | 6/1961 | Wagner et al. ....................... | 106/90 |
| 3,437,619 | 4/1969 | Nutt...................................... | 106/90 |
| 3,487,038 | 12/1969 | Toy et al............................... | 106/90 |
| 3,591,542 | 7/1971 | Bonnel et al......................... | 260/29.6 |
| 3,661,620 | 5/1972 | Dekking et al. .................. | 260/42.53 |
| 3,856,745 | 12/1974 | Yamaguchi et al.............. | 260/42.53 |

FOREIGN PATENTS OR APPLICATIONS

| | | | |
|---|---|---|---|
| 1,471,481 | 12/1968 | Germany ............................. | 106/90 |
| 1,014,795 | 12/1965 | United Kingdom.................. | 106/90 |
| 1,150,376 | 4/1969 | United Kingdom.................. | 106/90 |
| 411,274 | 7/1966 | Japan.................................... | 106/90 |
| 444,215 | 2/1969 | Japan.................................... | 106/90 |

*Primary Examiner*—Eugene C. Rzucidlo
*Attorney, Agent, or Firm*—William J. Daniel

[57] ABSTRACT

A hardenable molding composition comprising hydratable gypsum, a vinyl monomer, a source of hydrogen sulfite ions and water is disclosed. With this molding composition a hardened product can be obtained having high strength due to the combined effect of the hydraulic reaction of the gypsum and the polymerization reaction of the vinyl monomer.

7 Claims, No Drawings

3,950,295

METHOD OF PREPARING A COMPOSITION CONTAINING GYPSUM, A VINYL MONOMER AND SULFITE ION

BACKGROUND OF THE INVENTION

The present invention relates to a novel gypsum-based composition suitable as a molding material.

Molding compositions giving the combined effects of the hydrualic reaction of low hydrated gypsum and the curing reaction of a synthetic resin have heretofore been obtained by kneading a mixture of half-hydrated gypsum powder and a synthetic resin such as urea-formaldehyde resin, phenol-formaldehyde resin, acryl resin, polystyrene resin and polyvinyl alcohol resin dissolved in water. However, when a previously prepared resin composition is kneaded, great improvement in strength due to the effect of curing the resin itself cannot be expected, so that there is a limitation to the strength attainable. Also, if it is intended to increase the strength, a very large quantity of resin should be used.

It is also known in the art to obtain a hardened product of high strength by the so-called impregnation method, in which gypsum is impregnated with a solution of a monomer, the resultant system being subsequently subjected to a step of thermal polymerization. This method, however, involves a number of steps and requires special equipment. Moreover, it is usually difficult to achieve sufficient impregnation with the monomer liquid, so that the lack of uniformity of strength inevitably results.

BRIEF SUMMARY OF THE INVENTION

Accordingly, it is an object of the present invention to provide a gypsum-based molding composition which contains a small quantity of a monomer component and nevertheless results in hardened products having high strength.

It is another object of the present invention to provide a novel molding composition utilizing the hydraulic reaction of gypsum together with the polymerization reaction of a vinyl monomer in the presence of the gypsum and acidic sulfite ions serving as a polymerization initiator.

It is a further object of the present invention to provide a method of molding comprising hardening a molding composition of the type in question by bringing gypsum and a vinyl monomer into contact in the presence of water containing hydrogen sulfite ions.

The above and further objects, features and advantages of the present invention will appear more fully from the following description.

DETAILED DESCRIPTION OF THE INVENTION

The various objects of the present invention can be achieved using a mixture of low hydrated gypsum, vinyl monomer, a source of acidic sulfite ions, and water as a molding composition.

The term "hydratable gypsum" means gypsum capable of hardening by absorbing water. Such gypsum may, for instance, be dehydrated gypsum, half dehydrated gypsum and partially dehydrated gypsum. Also, gypsum produced as a by-product in the desulfurization of exhaust smoke may be used as well.

The term "vinyl monomer" means a compound capable of polymerization into a vinyl polymer in the presence of a radical polymerization initiator, for example, acrylic acid, methacrylic acid, acrylate, methacrylate, acrylic ester, methacrylic ester, acrylamide, N-methylolacrylamide, acrylonitrile, styrene, vinyl chloride, vinyl acetate, divinylbenzene, etc. The quantity of this monomer is not particularly limited, but in case high strength and fire-resistance are aimed at, it is desirable to select an amount within a range of 1 to 15 parts by weight for 100 parts by weight of gypsum.

The term "hydrogen sulfite ion source" means a substance capable of provide hydrogen sulfite ions ($HSO_3^-$) in the presence of water. Examples of such substances are sulfur dioxide, sulfurous acid solution, salts of hydrogen sulfite, such as ammonium hydrogen sulfite and sodium hydrogen sulfite and a combination of sulfite and acid. The hydrogen sulfite ion source is incorporated in an amount of 0.01 to 500 parts by weight, preferably 0.1 to 100 parts by weight, calculated in terms of sulfur dioxide, for 100 parts by weight of the monomer.

Water in the composition according to the present invention is incorporated in an amount required for hydration of the gypsum, usually in a range of 40 to 80 parts by weight for 100 parts by weight of gypsum.

While the composition according to the present invention is essentially a mixture composed of gypsum, vinyl monomer, hydrogen sulfite ion source substance and water, it is possible to incorporate various other additives if desired. For example, it is possible to incorporate customary emulsifier and defoaming agents. Furthermore, other polymers or polymer emulsions may be added to achieve the end result of suppressing volatilization of the monomer. Examples of such additives are such polymers as polyacrylamide and polyacrylic acid and such emulsions are polyvinyl chloride emulsion, polyvinyl acetate emulsion and polybutadiene emulsion.

The present composition may be readily prepared by uniformly kneading the mixture of the above components and desired additive components. This means that it is possible to adopt the same method as used in prior art gypsum forming. According to the invention, the hardening proceeds due to the polymerization of the monomer only when both gypsum and hydrogen sulfite ions are present. Accordingly, it is advantageous to add the hydrogen sulfite ion source at the time of molding, but not during storage.

In order to obtain the intended effects, the composition must contain the four components, gypsum, vinyl monomer, hydrogen sulfite ion source and water. Contrariwise, sufficient effects cannot be achieved if one of these essential components is lacking. By way of example, a hardened product of high strength cannot be obtained by adding a well-known polymerization initiator capable of causing radical polymerization of the monomer in lieu of the hydrogen sulfite ion source.

The composition according to the present invention can be prepared very simply compared to the prior art impregnation method. It can be prepared by merely kneading the requisite components together without the need for any special procedures such as heat treatment to obtain the hardened product or any special equipment. Also, since a hardened product of high strength is obtained with a small polymer content, it is possible to greatly improve the fire resistance thereof.

Further, the composition according to the present invention can be used exactly in the same manner as the prior art resin impregnated gpysum. For example, it may be used as construction material, for industrial art work and for daily commodities, sundry goods and furniture. Also, it can find useful application as a base material and as plaster.

The following examples are given to illustrate some preferred modes of executing the present invention.

EXAMPLE 1

2.0 g of methyl methacrylate were suspended in 55 ml of water at room temperature. 2.0 g of sulfur dioxide were then blown into the monomer suspension, and 100 g of half dehydrated gypsum were further added. The resultant mixture was kneaded for 2 minutes into a paste and then quickly charged into a mold and left there. Subsequently, unreacted monomer was removed under reduced pressure and the bending strength and compression strength of the resultant product were measured.

For comparison, gypsum alone was added to 55 ml of water at room temperature and the paste prepared by kneading the resultant mixture for 2 minutes was quickly charged into the same mold and left there. Subsequently, the bending strength and compression strength of the resultant product were measured.

|  | Curing Time (Days) | Bending Strength (Kg/cm$^2$) | Compression Strength (Kg/cm$^2$) |
|---|---|---|---|
| Composition | 1 | 81 | 167 |
| of | 2 | 80 | 170 |
| Invention | 7 | 87 | 179 |
| Comparison | 1 | 38 | 81 |
| Composition | 2 | 36 | 79 |

The measured values in the table are averages of 5 to 8 measurements.

EXAMPLE 2

2.0 g of methyl methacrylate were suspended in 50 ml of water at room temperature, and 6.0 g of sulfur dioxide were blown into and dissolved in the monomer suspension. Then, 80 g of half dehydrated gypsum and 20 g of calcium hydroxide were added to the resultant reaction liquid and the resultant mixture was kneaded for 2 minutes into a paste and quickly charged into a mold and left there. Subsequently, unreacted monomer was removed and the bending strength and compression strength of the resultant product were measured.

For comparison, 80 g of gypsum and 20 g of calcium hydroxide were added to 50 ml of water at room temperature and the paste prepared by kneading the resultant mixture for 2 minutes was quickly charged into the same mold and left there. Subsequently, the bending strength and compression strength of the resultant product were measured.

|  | Curing Time (Days) | Bending Strength (Kg/cm$^2$) | Compression Strength (Kg/cm$^2$) |
|---|---|---|---|
| Composition | 1 | 71 | 149 |
| of | 4 | 74 | 154 |
| Invention | 7 | 77 | 161 |
| Comparison | 1 | 32 | 80 |
| Composition | 7 | 36 | 77 |

The measured values in the table are averages of 5 to 8 mersurements.

EXAMPLE 3

0.6 g of polyvinylidene chloride and 2 g of polyvinylidene chloride-polyvinyl chloride latex were added to 55 ml of a water solution containing 0.2 g of a non-ionic surface active agent. Then, 2.0 g of methyl methacrylate monomer were added to form an emulsion and 2.0 g of sulfur dioxide were blown into and dissolved in the emulsion, to which were further added 100 g of half dehydrated gypsum. The resultant mixture was kneaded for 2 minutes and then quickly charged into a mold and left there. Subsequently, unreacted monomer was removed and the bending strength and compression strength of the resultant product were measured.

| Curing Time (Days) | Bending Strength (Kg/cm$^2$) | Compression Strength (Kg/cm$^2$) |
|---|---|---|
| 1 | 79 | 160 |
| 4 | 81 | 163 |
| 7 | 85 | 165 |

The measured values in the table are averages of 5 to 8 measurements.

EXAMPLE 4

2 g of the polymer latex used in Example 3, 0.2 g of non-ionic surface active agent and several drops of silicone were added to 55 ml of water. Then, 2.0 g of methyl methacrylate monomer were added to form an emulsion and 1.8 g of sulfur dioxide were blown into and dissolved in the emulsion, to which were further added 100 g of half dehydrated gypsum. The resultant mixture was then kneaded for 2 minutes and then quickly charged into a mold and left there. Subsequently, unreacted monomer was removed and the bending strength and compression strength of the resultant product were measured.

| Curing Time (Days) | Bending Strength (Kg/cm$^2$) | Compression Strength (Kg/cm$^2$) |
|---|---|---|
| 1 | 101 | 185 |
| 4 | 116 | 229 |

The measured values in the table are averages of 5 to 8 measurements.

Example 6

2 g of the polymer latex used in Example 3, 0.2 g of non-ionic surface active agent and several drops of silicone were added to 55 ml of water and then 2.0 g of methyl methacrylate monomer were added to form an emulsion. 0.6 g of sulfur dioxide were added to the emulsion, to which were further added several drops of hydrogen peroxide and 100 g of half dehydrated gypsum. The resultant mixture was kneaded for 2 minutes and then quickly charged into a mold and left there. Subsequently, unreacted monomer was removed and the bending strength and compression strength of the resultant product were measured.

| Curing Time (Days) | Bending Strength (Kg/cm²) | Compression Strength (Kg/cm²) |
| --- | --- | --- |
| 1/12 | 45 | 89 |
| 1 | 71 | 150 |
| 3 | 109 | 193 |
| 7 | 125 | 246 |

The measured values in the table are averages of 5 to 8 measurements.

EXAMPLE 7

2.0 g of methyl methacrylate were suspended in 50 ml of water at room temperature and 20 g of sulfur dioxide were blown into and dissolved in the suspension. Further, 80 g of half dehydrated gypsum and 20 g of calcothar were added and the resultant mixture was kneaded for 2 minutes and then quickly charged into a mold and left there. Subsequently, unreacted monomer was removed and the bending strength and compression strength of the resultant product were measured.

For comparison, 80 g of half dehydrated gypsum and 20 g of calcothar were added to 50 ml of water at room temperature and the resultant mixture was kneaded for 2 minutes and then quickly charged into a mold and left there. Subsequently, the bending strength and compression strength of the resultant product were measured.

| | Curing Time (Days) | Bending Strength (Kg/cm²) | Compression Strength (Kg/cm²) |
| --- | --- | --- | --- |
| Composition of Invention | 1 | 78 | 163 |
|  | 4 | 81 | 168 |
|  | 7 | 83 | 170 |
| Comparison Composition | 1 | 36 | 79 |
|  | 7 | 35 | 78 |

The measured values in the table are averages of 5 to 8 measurements.

EXAMPLE 8

3.0 g of methyl methacrylate were suspended in 50 ml of water at room temperature and 1.8 g of sulfur dioxide were blown into and dissolved in the suspension. Then, 80 g of half dehydrated gypsum and 20 g of river sand were added at room temperature and the resultant mixture was kneaded for 2 minutes and then quickly charged into a mold and left there. Subsequently, unreacted monomer was removed and the bending strength and compression strength of the resultant product were measured.

For comparison, 80 g of half dehydrated gypsum and 20 g of river sand were added to 50 ml of water at room temperature and the resultant mixture was kneaded for 2 minutes and then quickly charged into a mold and left there. Subsequently, the bending strength and compression strength of the resultant product were measured.

| | Curing Time (Days) | Bending Strength (Kg/cm²) | Compression Strength (Kg/cm²) |
| --- | --- | --- | --- |
| Composition of Invention | 1 | 73 | 151 |
|  | 4 | 75 | 163 |
|  | 8 | 78 | 169 |
| Comparison Composition | 1 | 40 | 84 |
|  | 8 | 41 | 85 |

The measured values in the table are averages of 5 to 8 measurements.

EXAMPLE 9

1.5 g of styrene monomer and methyl methacrylate monomer were suspended in 50 ml of water at room temperature and then 1.3 g of sulfur dioxide were blown into and dissolved in the suspension. To the resultant liquid were further added 100 g of half dehydrated gypsum and the resultant mixture was kneaded for 2 minutes and then quickly charged into a mold and left there. Subsequently, unreacted monomer was removed by the pressure reduction method and the bending strength and compression strength of the resultant product were measured.

| Curing Time (Days) | Bending Strength (Kg/cm²) | Compression Strength (Kg/cm²) |
| --- | --- | --- |
| 1 | 75 | 160 |
| 2 | 83 | 173 |
| 7 | 85 | 176 |

The measured values in the table are averages of 5 to 8 measurements.

EXAMPLE 10

3.0 g of acrylonitrile monomer were suspended in 35 ml of water at room temperature. Then, 15 ml of 1.8 N sulfurous acid solution were added and, further, 100 g of half dehydrated gypsum were added. The resultant mixture was kneaded for 2 minutes and then quickly charged into a mold and left there. Subsequently, unreacted monomer was removed and the bending strength and compression strength of the resultant product were measured.

| Curing Time (Days) | Bending Strength (Kg/cm²) | Compression Strength (Kg/cm²) |
| --- | --- | --- |
| 1 | 72 | 150 |
| 8 | 79 | 169 |

The measured values in the table are averages of 5 to 8 measurements.

EXAMPLE 11

2.5 of styrene monomer were added to 55 ml of a water solution containing 0.1 g of non-ionic surface active at room temperature to form an emulsion. Then, 1.0 g of sulfur dioxide was blown into and dissolved in the emulsion, to which were added 100 g of gypsum. The resultant mixture was kneaded for 2 minutes and then quickly charged into a mold and left there. Subsequently, unreacted monomer was removed and the bending strength and compression strength of the resultant product were measured.

| Curing Time (Days) | Bending Strength (Kg/cm²) | Compression Strength (Kg/cm²) |
| --- | --- | --- |
| 1 | 75 | 158 |
| 8 | 80 | 165 |

The measured values in the table are averages of 5 to 8 measurements.

EXAMPLE 12

10 g of methyl methacrylate and 10 g of methyl acrylate were suspended in 50 ml of water at room temperature. Then, 1.5 g of sulfur dioxide was blown into and dissolved in the suspension, to which was further added 100 g of half dehydrated gypsum. The resultant mixture was kneaded for 2 minutes and then quickly charged into a mold and left there. Subsequently, unreacted monomer was removed and the bending strength and compression strength of the resultant product were measured.

| Curing Time (Days) | Bending Strength (Kg/cm²) | Compression Strength (Kg/cm²) |
| --- | --- | --- |
| 1 | 89 | 180 |
| 7 | 110 | 220 |

The measured values in the table are averages of 5 to 8 measurements.

What is claimed is:

1. A method of preparing a gypsum vinyl polymer composite which comprises forming a mixture consisting essentially of hydratable gypsum powder, about 1–15 parts per 100 parts of said gypsum of a vinyl monomer, about 40–80 parts per 100 parts of said gypsum of water, and about 0.1–100 parts, calculated as sulfur dioxide, per 100 parts of vinyl monomer of a source of hydrogen sulfite ions as the essential polymerization agent for said vinyl monomer and allowing said mixture to harden by simultaneous polymerization of said monomer and hydration of said gypsum, said parts all being by weight.

2. The method of claim 11 wherein a vinyl polymer emulsion in sufficient amount to suppress volatilization of said monomer is added to said mixture.

3. A method according to claim 7 wherein said vinyl monomer is methyl methacrylate, styrene, or acrylonitrile.

4. A method according to claim 1 wherein said vinyl monomer is a mixture of methyl methacrylate and methyl acrylate.

5. A method according to claim 2 wherein said polymer emulsion is a mixture of polyvinylidene chloride and polyvinyl chloride.

6. A method of molding which comprises mixing into a paste hydratable gypsum powder, about 1–15 parts per 100 parts of said gypsum of a vinyl monomer, sufficient water to hydrate said gypsum, and sufficient amount of a source of hydrogen sulfite ions to effect polymerization of said monomer, molding said paste to the desired configuration and allowing the thus-molded paste to harden whereby the hardened product exhibits strength characteristics contributed by both the hydration of said gypsum and the in situ polymerization of said monomer.

7. The method of claim 6 wherein said water is present in the range of 40–80 parts by weight per 100 parts by weight of said gypsum, and said ion source is present in the range of about 0.01–500 parts by weight per 100 parts by weight of said monomer.

* * * * *

UNITED STATES PATENT AND TRADEMARK OFFICE
CERTIFICATE OF CORRECTION

PATENT NO. : 3,950,295

DATED : April 13, 1976

INVENTOR(S) : Tadashi Yamaguchi et al

It is certified that error appears in the above–identified patent and that said Letters Patent are hereby corrected as shown below:

Column 8, claim 2, line 1, "11" should read -- 1 --.

Column 8, claim 3, line 1, "7" should read -- 1 --.

Signed and Sealed this fifteenth Day of June 1976

[SEAL]

Attest:

RUTH C. MASON
*Attesting Officer*

C. MARSHALL DANN
*Commissioner of Patents and Trademarks*